US009423494B2

(12) United States Patent
Stokes et al.

(10) Patent No.: US 9,423,494 B2
(45) Date of Patent: Aug. 23, 2016

(54) WIDEBAND SONAR WITH PULSE COMPRESSION

(71) Applicant: FLIR Systems, Inc., Wilsonville, OR (US)

(72) Inventors: Paul Stokes, Hampshire (GB); David Wellcome, Hampshire (GB)

(73) Assignee: FLIR Systems, Inc., Wilsonville, OR (US)

( * ) Notice: Subject to any disclaimer, the term of this patent is extended or adjusted under 35 U.S.C. 154(b) by 99 days.

(21) Appl. No.: 14/261,342

(22) Filed: Apr. 24, 2014

(65) Prior Publication Data

US 2014/0233355 A1   Aug. 21, 2014

Related U.S. Application Data

(63) Continuation of application No. PCT/US2012/062288, filed on Oct. 26, 2012.

(60) Provisional application No. 61/551,859, filed on Oct. 26, 2011, provisional application No. 61/551,883, filed on Oct. 26, 2011.

(51) Int. Cl.
*G01S 7/524* (2006.01)
*G01S 15/02* (2006.01)
*B06B 1/02* (2006.01)
*G01S 7/521* (2006.01)
*H01F 19/06* (2006.01)

(52) U.S. Cl.
CPC .............. *G01S 7/524* (2013.01); *B06B 1/0223* (2013.01); *G01S 7/521* (2013.01); *G01S 15/02* (2013.01); *H01F 19/06* (2013.01)

(58) Field of Classification Search
CPC ....... B06B 1/0223; G01S 7/521; G01S 15/02; G01S 7/524; H01F 19/06
See application file for complete search history.

(56) References Cited

U.S. PATENT DOCUMENTS

| 3,680,105 A | 7/1972 | Goldstone |
| 3,931,549 A | 1/1976 | Berns et al. |
| 4,626,853 A | 12/1986 | Lee et al. |
| 4,710,772 A | 12/1987 | Cantwell et al. |
| 4,787,847 A * | 11/1988 | Martin ................ A61C 17/20 15/22.1 |
| 4,949,318 A | 8/1990 | Patrick et al. |
| 5,070,337 A | 12/1991 | Chen et al. |
| 5,532,700 A | 7/1996 | Lockwood |
| 6,432,055 B1 | 8/2002 | Carp et al. |
| 2003/0128554 A1* | 7/2003 | Crewson ................ H01F 30/06 363/16 |
| 2004/0109388 A1 | 6/2004 | Sogaard |
| 2004/0254459 A1 | 12/2004 | Kristoffersen et al. |
| 2005/0007879 A1 | 1/2005 | Nishida |
| 2008/0037371 A1 | 2/2008 | Chang et al. |

(Continued)

FOREIGN PATENT DOCUMENTS

| DE | 4117849 | 12/1992 | |
| DE | EP 2189808 A1 * | 5/2010 | .............. G01S 7/524 |

(Continued)

*Primary Examiner* — Daniel Pihulic (74) *Attorney, Agent, or Firm* — Haynes and Boone, LLP (57) ABSTRACT

A sonar transmitter includes digital logic that controls switches coupled to a primary coil of a transformer. The switches are driven to produce at least one voltage pulse across a secondary coil for the transformer to produce a series of voltage pulses approximating the desired signal. The transformer may comprise: a secondary coil having a plurality of windings arranged into a first section, a middle section, and a final section; and a primary coil winding wound only with the secondary coil windings forming the middle section.

19 Claims, 7 Drawing Sheets

(56) References Cited

U.S. PATENT DOCUMENTS

| | | |
|---|---|---|
| 2008/0080316 A1 | 4/2008 | Inouchi et al. |
| 2010/0097891 A1 | 4/2010 | Cummings |
| 2010/0253458 A1 | 10/2010 | Chen et al. |
| 2011/0002191 A1 | 1/2011 | DeMaio et al. |
| 2011/0007606 A1 | 1/2011 | Curtis |
| 2011/0032801 A1 | 2/2011 | Onishi et al. |
| 2011/0184289 A1* | 7/2011 | Oshiki .................. B06B 1/023 600/443 |
| 2014/0233355 A1* | 8/2014 | Stokes .................. B06B 1/0223 367/87 |
| 2015/0294660 A1* | 10/2015 | Stokes .................. G10K 11/006 367/173 |

FOREIGN PATENT DOCUMENTS

| | | | |
|---|---|---|---|
| EP | 2189808 | 5/2010 | |
| JP | 2005045057 | 2/2005 | |
| WO | WO 2013063515 A3 * | 8/2013 | ............ B06B 1/0223 |

* cited by examiner

WIDEBAND SONAR WITH PULSE COMPRESSION

RELATED APPLICATIONS

This patent application is a continuation of International Patent Application No. PCT/US2012/062288 filed Oct. 26, 2012, which claims priority to and the benefit of U.S. Provisional Patent Application No. 61/551,883 filed Oct. 26, 2011 and U.S. Provisional Patent Application No. 61/551,859 filed Oct. 26, 2011. The contents of all of the above-noted applications are hereby incorporated by reference in their entirety.

TECHNICAL FIELD

The present invention relates generally to sonar, and more particularly a sonar system with digital pulse compression.

BACKGROUND

Producing frequency-modulated sonar systems for commercial applications such as fish finding routinely faces cost pressures. Thus, advanced signal processing techniques must be implemented in an efficient, cost-effective manner. For example, it is desirable to offer relatively high power (such as 1 kW) over a wideband frequency range such as 25 kHz to 255 kHz. However, the cost pressures for commercial implementations prevent the use of convenient solutions such as a linear power amplifier.

In a conventional sonar, the power amplifier drives a transducer through a transformer. The transformer isolates the transducer and also functions to impedance match the transducer to the amplifier. In general, such a transformer should have a relatively low insertion loss to maximize the power delivered to the transducer and also to minimize the associated heating effects from the insertion loss. But maintaining a low insertion loss is problematic in view of real-world effects such as coupling between transformer windings and associated parasitics.

The demands on transformer performance are exacerbated in a wideband sonar application. Such wideband performance is desirable in that shallow water performance favors a relatively high frequency sonar pulse whereas deeper water performance is enhanced with a relatively lower frequency sonar pulse. The transformer must perform at both the relatively low frequencies as well as the relatively high frequencies and thus requires suitable wideband performance. Achieving a desired performance for an isolating transformer in a wideband sonar system is difficult in light of the increased reactance encountered when operating transducers over a wide bandwidth. Wideband isolating transformers must satisfy conflicting demands in that low frequency operation demands high shunt inductance whereas suitable high frequency operation requires low inductance (in particular, low leakage inductance) to avoid resonating with the capacitive load presented by the transducer.

Accordingly, there is a need in the art for improved sonar systems that offer frequency agile performance and relatively high power at low cost. In addition, there is a need in the art for isolating transformers that satisfy the conflicting demands presented by wideband sonar applications.

SUMMARY

In accordance with a first aspect of the disclosure, a wideband sonar transmitter is provided that includes: a power supply; a pair of switches; and a wideband transformer having a secondary coil for driving a transducer and a primary coil having a center tap driven by the power supply, wherein a first end of the primary coil couples to ground through a first one of the switches, and a second end of the primary coil couples to ground through a second one of the switches.

In accordance with a second aspect of the disclosure, a method of generating wideband sonar pulses is provided that includes: in digital logic, analyzing a desired wideband sonar signal to identify positive half cycles and negative half cycles of the desired signal; and with regard to each half cycle, approximating the half cycle by driving switches coupled to a transformer's primary coil to produce at least one voltage pulse across a secondary coil for the transformer.

In accordance with a third aspect of the disclosure, a sonar system is provided that includes: a voltage source; a transformer having a primary coil and a secondary coil, wherein the voltage source couples to the primary coil; and digital logic adapted to approximate a desired sonar wideband signal through a series of positive and negative voltage pulses across the secondary coil, wherein the digital logic is adapted to control the primary coil such that the voltage source drives current through the primary in a first direction to create the positive voltages pulses and such that the voltage source drives current through the primary in an opposite second direction to create the negative voltage pulses.

DETAILED DESCRIPTION

Figure 1:
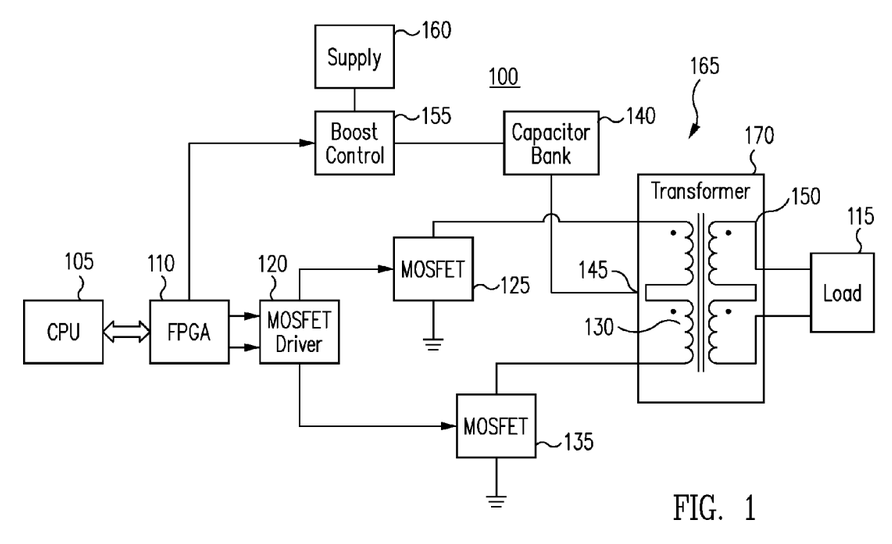
FIG. 1 is a block diagram of an example sonar transmitter in accordance with an embodiment.

To provide a frequency-agile sonar with high efficiency yet low cost, digital logic controls switches coupled to a transformer's center-tapped primary coil so as to approximate positive and negative half sinusoid cycles at a load attached to the transformer's secondary coil. Turning now to the drawings, an example sonar transmitter 100 as shown in FIG. 1 uses a CPU 105 and an FPGA 110 as the digital logic. CPU 105 commands for a desired waveform at a transducer load 115 based upon burst length, frequency content, and amplitude shaping requirements. Transmitter 100 approximates the desired waveform through pulse width modulation using positive and negative voltage pulses. One or more positive voltage pulses approximates the positive half cycle of a desired sinusoid. Similarly, one or more negative voltage pulses approximates the negative half cycle of the desired sinusoid.

FPGA 110 controls a MOSFET driver 120 to turn on and off switches implemented by a MOSFET 125 and a MOSFET 135. MOSFETs 125 and 135 are coupled to opposing ends of a center-tapped primary coil 130 within an isolating transformer 170. A power source such as a capacitor bank 140 drives a center tap 145 on primary coil 130. A default state for MOSFETs 125 and 135 is off. However, if MOSFET 135 is turned on, a positive voltage pulse is excited through a secondary coil 150 onto transducer load 115. Conversely, if MOSFET 125 is turned on, a negative voltage pulse is impressed on load 115.

FPGA 110 also drives a boost control circuit 155. Boost control circuit boosts a power supply voltage from a power supply 160 to charge capacitor bank 140 to a desired voltage level. In this fashion, capacitor bank 140 provides a high energy reservoir to drive load 115. The amount of voltage boost applied by boost control circuit 155 depends upon the desired output power and transducer impedance. In one embodiment, boost control circuit charges capacitor bank 140 in a range from 0 Vdc to 150 Vdc by boosting a power supply voltage ranging from 10.2 Vdc to 32 Vdc. For example, boost control circuit may use a switching boost regulator-type circuit to achieve this range of output voltages. Such a circuit reaches the desired voltage level quickly without drawing excessive current (e.g., 8 A maximum current draw). In one embodiment, the switching boost circuit may be based on a capacitor charger such as used for photo flash operation on cameras. Advantageously, such capacitor chargers have high efficiency, are simple to operate, and include additional safeguards such as under voltage lockout and maximum charge cut-off. To store the resulting charge, capacitor bank 140 may have a voltage rating in excess of 150 V and provide sufficient capacitance to support a full power maximum length sonar pulse without excessive voltage droop.

Given the amount of charge and voltage levels that may be stored by capacitor bank 140, transmitter 100 may include a discharge circuit (not illustrated) to safely discharge capacitor bank 140 in a short period of time such as a few seconds. For example, FPGA 110 may control the discharge circuit to discharge capacitor bank 140 automatically when transmitter 100 is powered down. In this fashion, capacitor bank 140 is not left in a charged state so as to enhance safety. Transmitter 100 may also include a manual discharge control for operation by technicians prior to servicing.

Transformer 170 is a step-up transformer that, in one embodiment, uses a 1:6 turn ratio. The combination of transformer 170, a power supply such as capacitor bank 140 for driving center tap 145, and switches such as MOSFETs 125 and 135 for developing positive or negative voltage pulses across transducer load 115 effectively forms a class D type amplifier 165 that has significantly higher efficiency than a conventional linear power amplifier. In addition, amplifier 165 has a smaller footprint on a printed circuit board and does not require a heat sink, which would be heavy and expensive. In one embodiment, amplifier 165 can output pulses in a frequency range from 25 KHz to 255 KHz at power levels of up to 1 KW. This efficiency is achieved despite a capacitive impedance component of up to 30 nF for conventional transducers in this frequency range. A novel design for transformer 170 to achieve this performance is discussed further below.

Figure 2:
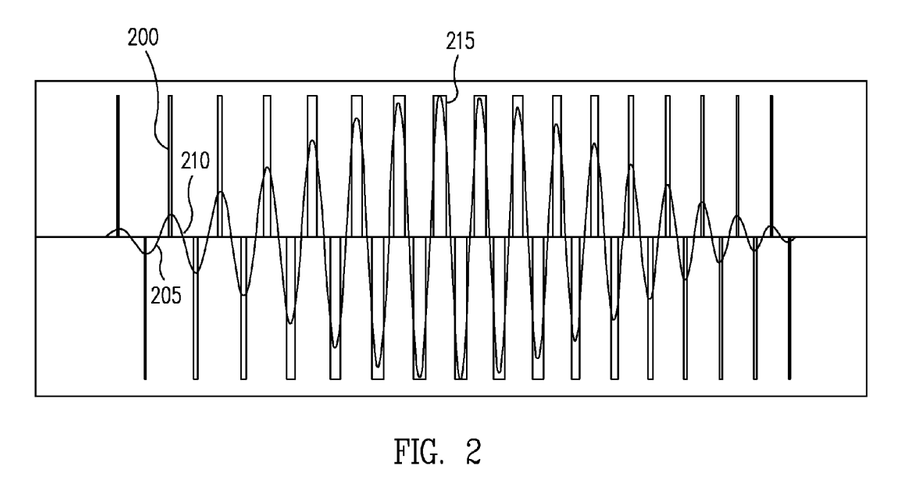
FIG. 2 illustrates a desired waveform and a series of pulse-width-modulated rectangular pulses used to approximate the desired waveform such that a single pulse approximates each half cycle of the desired waveform in accordance with an embodiment.

The pulse width modulation achieved by varying the on time periods for switches such as MOSFETs 125 and 135 may take numerous alternative embodiments. For example, an output sinusoid half cycle may be approximated using a single rectangular pulse having a width selected to produce the equivalent energy of the peak in the sinusoid half cycle as shown in FIG. 2. Each pulse is created by setting a reference position at the peak of the desired waveform. The trailing and leading edge of the pulse are then calculated based upon the desired peak waveform amplitude and distance to the corresponding nulls. For example, a trailing edge null 205 and a leading edge null 210 frame a positive rectangular pulse 200. Pulse 200 is relatively narrow to approximate the relatively low amplitude for the positive half cycle sinusoid extending between nulls 205 and 210. In contrast, a positive rectangular pulse 215 is relatively wide compared to pulse 200 because the sinusoid half cycle being approximated by pulse 215 has a relatively large peak amplitude. The pulse on and off times may be calculated with regard to a clock as counts of a resulting clock cycle.

A method to calculate the on and off times for a chirped sonar burst will now be discussed. It will be appreciated, however, that the pulse width modulation techniques discussed herein may be used to generate a wide variety of other types of waveforms. A chirped waveform is particularly advantageous in that the range resolution is enhanced through the resulting pulse compression. A chirp signal is given by $$\text{Chirp} = a * \sin(2\pi f t)$$

where a is the amplitude, f is the instantaneous frequency, and t is the time. The time t across a sonar burst may be considered to range from 0 to the burst length period. The instantaneous frequency f may thus be calculated as $$f = (fs + (fe - fs) * rat/2)$$

where fs is the starting frequency, fe is the ending frequency, and rat equals t/(burst length period). The number of peaks for the sonar burst may be determined by differentiating the chirp signal with regard to time to give $$Tpeaks = (-fs + \sqrt{fs^2 + (n - 1/2) * (fr/BL)}) / (fr/BL)$$

where Tpeaks is the number of peaks, fr=(fe fs), and BL is the burst length period. The number of zeroes (represented by Tzeroes) corresponding to these peaks is thus given by $$Tzeroes = (-fs + \sqrt{fs2 + n * (fr/BL)}) / (fr/BL)$$

where n is the peak number (minimum 1).

The number of half sinusoid cycles (represented by Nhalfcyles) across the sonar burst is given by $$Nhalfcycles = (fs + fe) * BL$$

Figure 3:
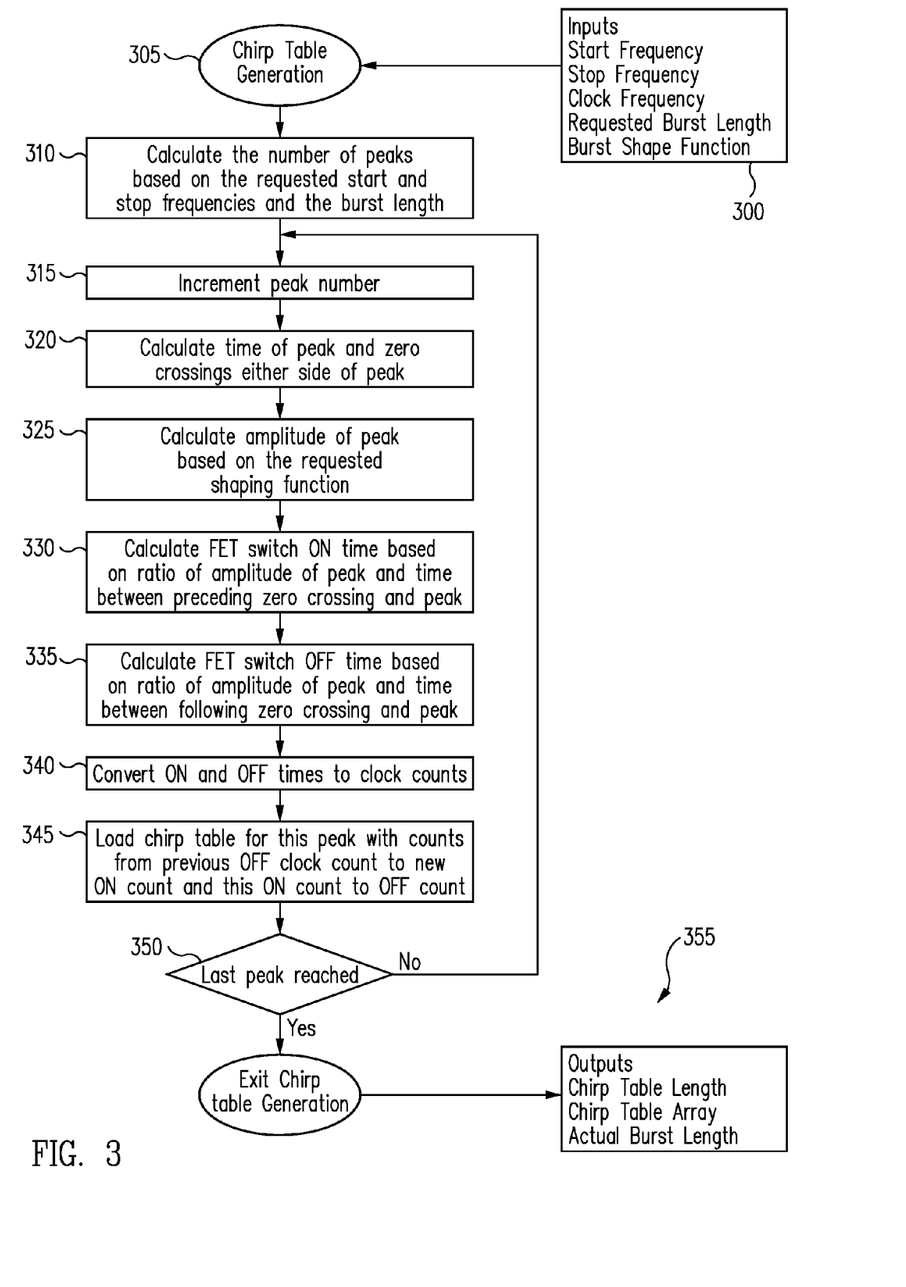
FIG. 3 is a flowchart for a method to calculate on and off pulse times for the pulses of FIG. 2 in accordance with an embodiment.

FIG. 3 is a flowchart for a method to generate the on and off pulse times accordingly.

The method uses as inputs 300 the starting frequency fs, the ending frequency fe, the clock frequency, the burst length BL, and the desired burst shaping function. Based upon these inputs, a chirp table generation method 305 is performed that calculates the pulse on and off times as counts of the clock cycles. The method begins with a step 310 of calculating Tpeaks as discussed above. In a step 315, the peak number is incremented by one. The peak number is initially set to zero such that the initial incrementing through step 315 sets the peak number to one. Subsequent calculation cycles cause step 315 to successively count through the remaining peaks in the sonar burst being approximated.

Given the peak number, the corresponding peak time and zero crossing times at either side of the peak may be calculated as discussed above in a step 320. Similarly, the amplitude of the peak may be calculated in a step 325 based upon the desired pulse shaping function. The FET switch on time may then be calculated in a step 330 based upon a ratio of the current peak amplitude and a time between the preceding zero and the current peak. Similarly, a step 335 calculates a FET off time based on a ratio of the current peak amplitude and a time between the subsequent zero and the current peak. In a step 340, the on and off times are converted to clock counts. In a step 345, the method loads a chirp timing table with the number of counts from the previous peak off time to the current peak on time. Similarly, step 345 also loads the chirp timing table with the counts from the current on time to the subsequent off time. A step 350 tests for whether any peaks remain unprocessed. If there are unprocessed peaks remaining, step 350 loops back to step 315 to increment the peak count so as to continue processing the peaks. If there are no peaks remaining, the method ends in a step 355 to output the chirp timing table as well as the chirp table length and the actual burst length.

The following Table 1 is an example chirp table calculated as discussed with regard to FIG. 3. For this chirp, the starting frequency is 130 KHz and the ending frequency is 210 KHz with a burst length period of 200 μs. To differentiate whether a particular timing entry pair of on and off times applies to FET 125 or to FET 135 (with regard to whether a positive or negative half sinusoid is being approximated) a flag bit may be set. For example, if the flag bit is true, then a timing entry pair applies to a negative pulse. Conversely, such a flag bit were false, then the timing entry pair applies to a positive pulse.

TABLE 1

| ChirpTable | 0x088C, 0x0080 | 0x0048, 0x009D |
|---|---|---|
| Fs: 130.0 kHz | 0x0090, 0x007B | 0x0842, 0x00A2 |
| Fe: 210.0 kHz | 0x0892, 0x0076 | 0x003D, 0x00A6 |
| BL: 200.0 us | 0x0096, 0x0071 | 0x0838, 0x00A9 |
| WT: KaiserBessel | 0x0897, 0x006E | 0x0033, 0x00AD |
| Nhc: 68 | 0x0099, 0x006B | 0x082F, 0x00B0 |
| 0x0008, 0x013F | 0x089A, 0x0068 | 0x002A, 0x00B3 |
| 0x080C, 0x0137 | 0x009A, 0x0067 | 0x0826, 0x00B7 |
| 0x0011, 0x012E | 0x0899, 0x0066 | 0x0021, 0x00BA |
| 0x0816, 0x0126 | 0x0098, 0x0066 | 0x081E, 0x00BC |
| 0x001B, 0x011C | 0x0896, 0x0066 | 0x001A, 0x00BF |
| 0x0822, 0x0113 | 0x0094, 0x0067 | 0x0817, 0x00C0 |
| 0x0027, 0x010A | 0x0891, 0x0068 | 0x0014, 0x00C3 |
| 0x082E, 0x00FF | 0x008E, 0x006A | 0x0811, 0x00C4 |
| 0x0036, 0x00F5 | 0x088B, 0x006C | 0x000E, 0x00C6 |
| 0x083D, 0x00EB | 0x0087, 0x006E | 0x080C, 0x00C7 |
| 0x0044, 0x00E1 | 0x0883, 0x0071 | 0x000A, 0x00C8 |
| 0x084B, 0x00D7 | 0x007E, 0x0074 | 0x0808, 0x00C9 |
| 0x0053, 0x00CC | 0x0879, 0x0078 | 0x0006, 0x00C9 |
| 0x085B, 0x00C2 | 0x0074, 0x007C | 0x0805, 0x00CA |
| 0x0062, 0x00B8 | 0x086F, 0x0080 | |
| 0x0869, 0x00AF | 0x0069, 0x0084 | |
| 0x0070, 0x00A6 | 0x0864, 0x0088 | |
| 0x0877, 0x009D | 0x005E, 0x008C | |
| 0x007C, 0x0096 | 0x0859, 0x0090 | |
| 0x0882, 0x008E | 0x0053, 0x0095 | |
| 0x0087, 0x0086 | 0x084E, 0x0099 | |

Figure 4:
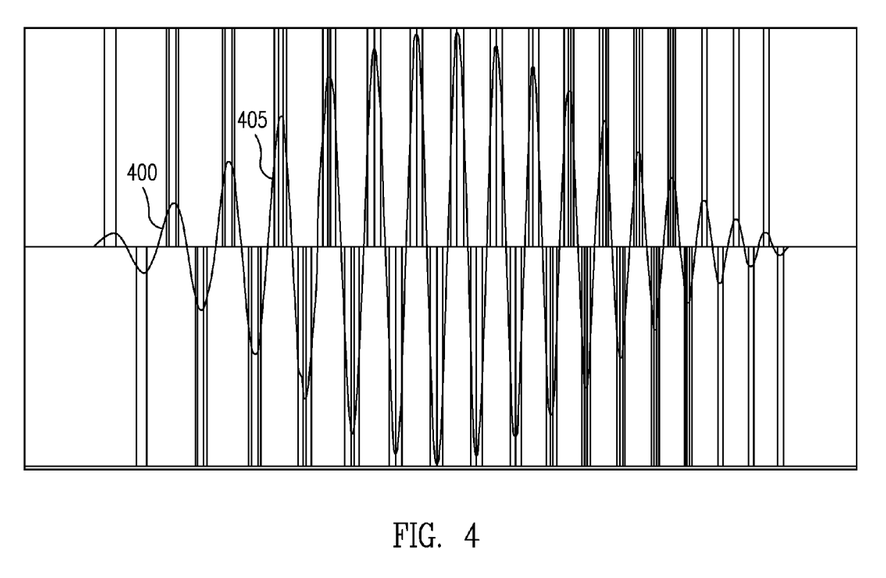
FIG. 4 illustrates a desired waveform and a series of pulse-width-modulated rectangular pulses used to approximate the desired waveform such that a pair of pulses approximates each half cycle of the desired waveform in accordance with an embodiment.

Rather than use a single rectangular pulse per half cycle as discussed with regard to FIGS. 2 and 3, multiple pulses may be used. For example, two pulses per half cycle may be used instead of the single rectangular pulse per half cycle method. This is advantageous in that the timing of the double pulses may be adjusted to tune out various harmonics but at the cost of increased memory requirements for storing the resulting chirp table. FIG. 4 shows an example desired waveform in which each sinusoid half cycle is approximated using two rectangular pulses. As discussed with regard to FIG. 2, the pulse widths are increased or decreased depending upon the desired amplitude. Thus, a sinusoid half cycle 400 having a relatively small peak amplitude is approximated using two relatively narrow pulses whereas a sinusoid half cycle 405 having a relatively large peak amplitude is approximated using a pair of relatively wider pulses. The separation between the pulses in each pulse pair has a significant effect on the harmonic suppression. For example, if the pulses are separated by 30% of the zero-to-zero width for the corresponding sinusoid half cycle that is being approximated, the 3rd harmonic is largely suppressed whereas a separation of 66% suppresses the 5th harmonic.

Figure 5A:
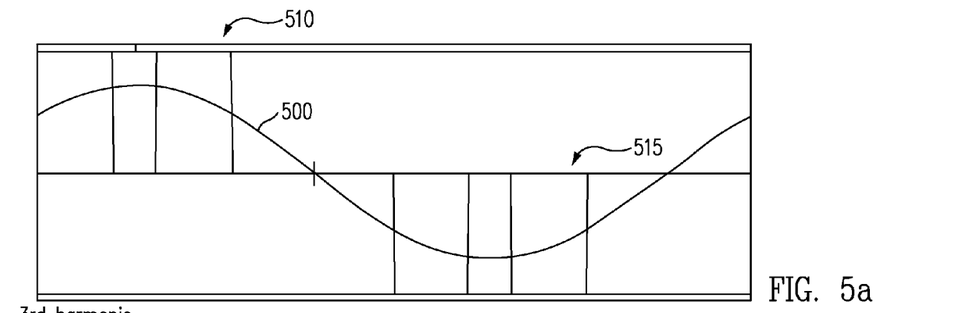
FIG. 5a shows a single cycle of the waveform of FIG. 4 with a pulse separation of 30% in accordance with an embodiment.
Figure 5B:
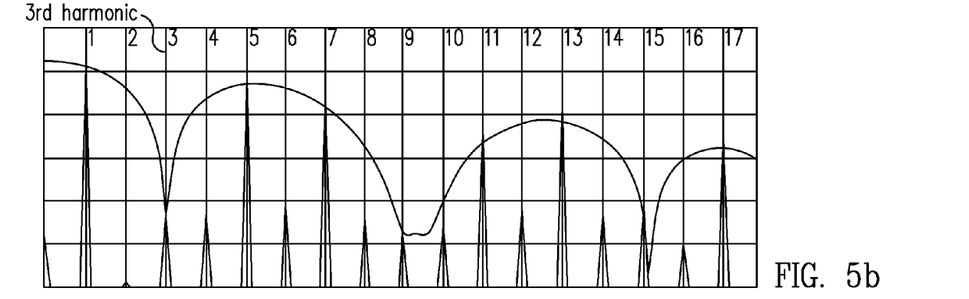
FIG. 5b shows the frequency spectrum for the waveform of FIG. 5a demonstrating the suppression of the 3rd harmonic.
Figure 6A:
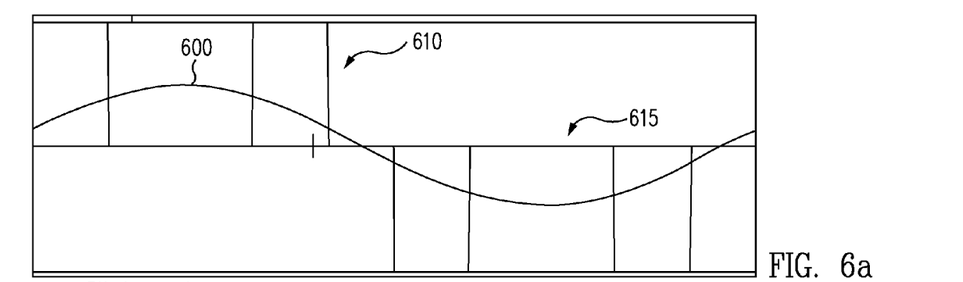
FIG. 6a shows a single cycle of the waveform of FIG. 4 with a pulse separation of 66% in accordance with an embodiment.
Figure 6B:
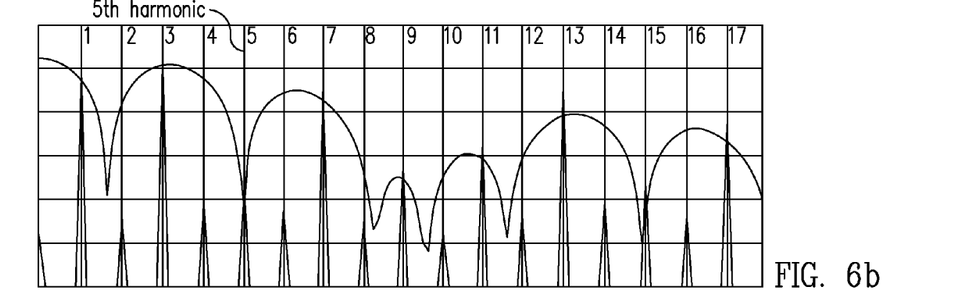
FIG. 6b shows the frequency spectrum for the waveform of FIG. 6a demonstrating the suppression of the 5th harmonic.

The harmonic suppression is further illustrated in FIGS. 5a, 5b, 6a, and 6b. FIG. 5a is a time domain representation of a sinusoid cycle 500 (two half cycles) being approximated by a pair of positive pulses 510 and a pair of negative pulses 515. FIG. 5b shows the frequency spectrum (frequency domain) for the resulting approximated sinusoid. A deep null exists at the 3rd harmonic due to the 30% separation in each pulse pair. In contrast, FIG. 6a shows a time domain representation of a sinusoid cycle 600 (two half cycles) being approximated by a pair of positive pulses 610 and a pair of negative pulses 615 each having a 66% separation. FIG. 6b shows the frequency spectrum for the resulting approximated sinusoid. A deep null exists at the 5th harmonic.

The pulse width modulation of positive and negative pulses as generated by a center-tapped transformer 170 across a relatively wide frequency range places great demands on the transformer design. An advantageous wideband transformer will now be described that satisfies the conflicting demands for wideband sonar operation. A better understanding of the design challenges that this wideband transformer solves may be had with reference to the circuit model of FIG. 7, which illustrates the various non-ideal parameters for a real-world transformer. The primary coil is modeled using a primary series resistance 700, a primary capacitance 705, a primary inductance 710, a primary leakage inductance 715, and a shunt resistance 720 that models losses from effects such as hysteresis and eddy currents. Similarly, the secondary coil is modeled using a secondary series resistance 725, a secondary leakage inductance 730, a secondary capacitance 735, and a secondary inductance 740. A capacitance 745 represents the capacitance between the primary and secondary coils.

Figure 7:
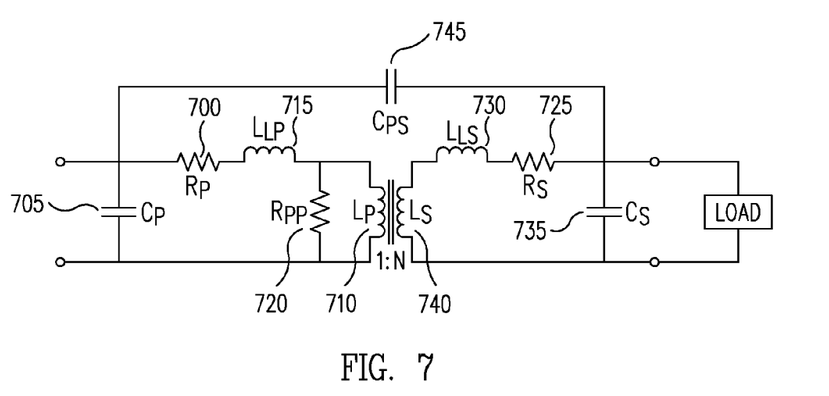
FIG. 7 is a diagram of a transformer equivalent circuit according to one embodiment.
Figure 8:
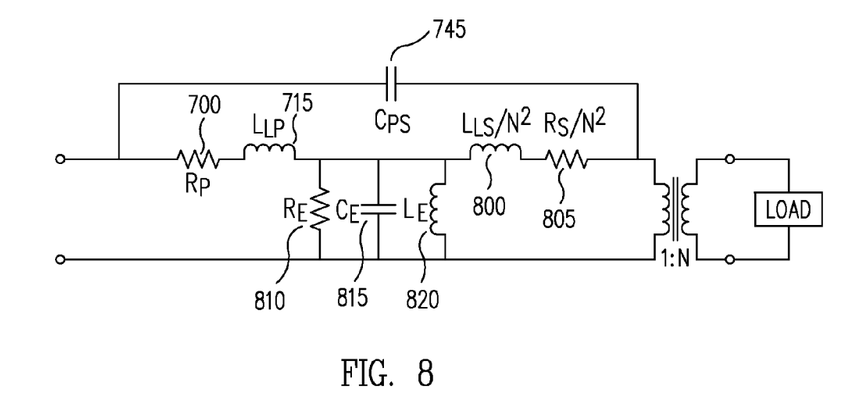
FIG. 8 is a consolidated diagram for the transformer equivalent circuit of FIG. 7.

The various non-ideal parameters of FIG. 7 may be simplified by reflecting the secondary coil behavior over onto the primary as shown in FIG. 8. The reflection takes into account the winding ratio N between the primary and the secondary coil. Thus, a reflected secondary inductance 800 and a reflected secondary series resistance 805 are reduced by a factor of $1/N^2$ as compared to the non-reflected values of FIG. 7. Similarly, a parallel resistance 810, a parallel capacitance 815, and a parallel inductance 820 represent a combination of the primary and reflected parallel values. The remaining model parameters are as discussed with regard to FIG. 7.

Figure 9A:
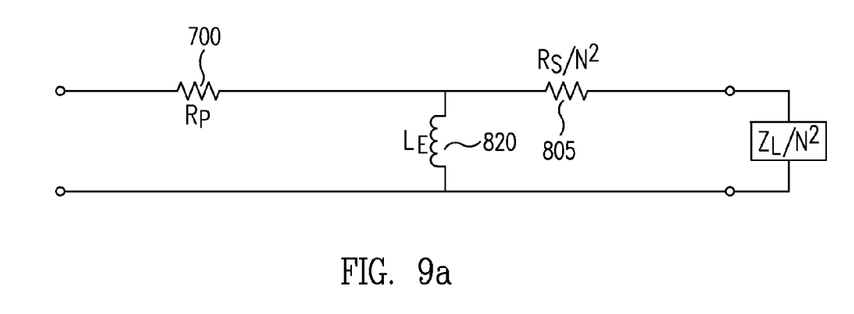
FIG. 9a is a diagram of low frequency equivalent circuit for the transformer equivalent circuit of FIG. 8.

The conflicting demands of low frequency transformer operation vs. the demands for high frequency operation may be better understood by simplifying FIG. 8 with regard to these frequency regimes. A low frequency equivalent circuit is shown in FIG. 9a. At this relatively low frequency, only primary series resistance 700, parallel inductance 820 (which may also be designated as the shunt inductance), and reflected secondary series resistance 805 are significant. The shunt impedance is given by $2\pi f \ast LE$, where LE represents the shunt inductance. This impedance should be large as compared to the effective load impedance of $Z_L/N^2$ (where $Z_L$ represents the load impedance) because the transfer function and losses are predominantly proportional to primary series resistance 700 and reflected secondary series resistance 805. To achieve an efficient transformer design for low frequency operation, the shunt impedance from shunt inductance 820 must also be large as compared to the effective load impedance. Thus, the lower a band edge frequency is for sonar operation, the higher the inductance requirement is for shunt inductance 820.

Figure 9B:
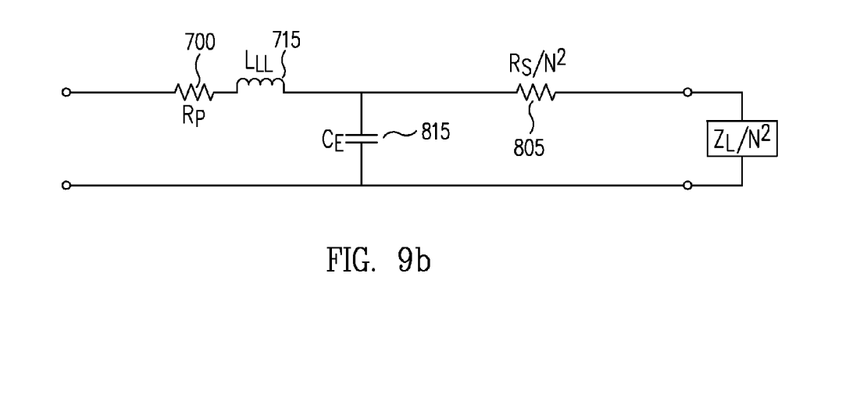
FIG. 9b is a diagram of high frequency equivalent circuit for the transformer equivalent circuit of FIG. 8.

In contrast, the shunt inductance may be neglected in the high frequency equivalent circuit as shown in FIG. 9b. However, leakage inductance 715 becomes important as it has a significant effect on the transfer function at higher frequencies. In particular, leakage inductance 715 should be relatively small compared with the resistive component of the load impedance to avoid attenuating the signal delivered to the load. In addition, as leakage inductance 715 increases, the possibility of resonance with the capacitive component of the load impedance increases. Thus, leakage inductance 715 should be relatively small for optimum high frequency sonar operation.

But leakage inductance 715 is directly related to the winding inductance along with the transformer construction and winding configuration. In an (unrealizable) perfect transformer, all of the magnetic flux generated by the primary coil couples through the transformer core with the secondary coil and vice versa. However, there is always some component of magnetic flux generated by the primary that does not couple through the transformer core with the secondary. This component "leaks" into the air or other medium outside the core and thus is referred to as leakage inductance 715. The secondary coil will also have its own leakage inductance component 730 as discussed with regard to FIG. 7. Recall that the primary inductance should be large for low frequency operation. Since leakage inductance 715 is partially dependent on the primary inductance, the high frequency demands of lowering the leakage inductance are at odds with the low frequency demands of increasing the primary inductance.

Figure 10:
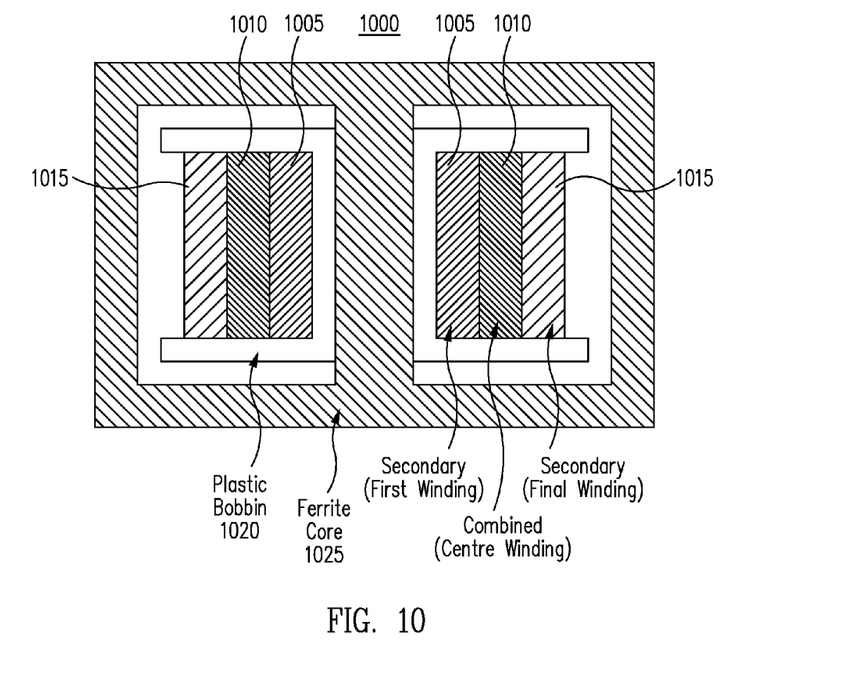
FIG. 10 is a cross-sectional view of a wideband isolating transformer according to one embodiment of the disclosure.

Turning now to FIG. 10, a transformer 1000 is shown in cross section that satisfies the competing wideband performance demands by dividing the secondary windings into a first section 1005, a combined center section 1010, and a final section 1015. Center section 1010 is a combined section in that it also includes the primary winding. In other words, combined center section 1010 includes a primary coil winding and also a secondary coil winding. Transformer 1000 gets better coupling than a conventional multi-filar transformer because of the splitting of the secondary coil into sections. This is particularly important for high power applications such as in sonar where there is a significant boost in voltage accomplished through the 1:N turn ratio between the primary and the secondary coils. An issue with high-power applications is the relatively large voltage gradient that is imposed between turns on the windings. But the sectional approach of transformer 1000 places the primary coil winding in combined center section 1010 where the voltage levels are lower.

To maximize coupling between the primary and secondary coil, the primary winding and center section secondary winding may be wound simultaneously during manufacture. Section 1005 for the secondary coil is first wound on a suitable support such as a plastic bobbin 1020. Then combined center section 1010 is formed by simultaneously winding the desired primary and secondary windings over section 1005. Finally, the secondary coil is completed by winding the remainder of the secondary coil winding (or windings) over combined center section 1010 to form final section 1015. Because the primary and secondary windings are simultaneously wound into center section 1010, they tightly couple their flux through the transformer core such as a ferrite core 1025 to minimize leakage inductance.

If transformer 1000 includes a center tap on the primary coil, a center tap may be introduced into the secondary to maximize flux coupling. Center section 1010 would thus include two windings for the primary and two windings for the secondary. An example array of resulting windings is shown in schematic form in FIG. 11. First section 1005 includes a single secondary winding 1105 between pins 1 and 2. Combined center section 1010 includes a first primary winding 1110 extending between pins 12 and 11 as well as a second primary winding 1115 extending between pins 10 and 9. Pins 10 and 11 form the center tap for the primary coil. The secondary coil portion of combined center section 1010 includes a first secondary winding 1120 extending between pins 2 and 3 as well as a second secondary winding 1125 extending between pins 3 and 4. Final section 1015 includes a single secondary winding 1130 extending between pins 4 and 5. An optional monitoring circuit (not illustrated) can monitor the secondary coil voltage through a primary-side winding 1140 that extends between pins 7 and 8.

Figure 11:
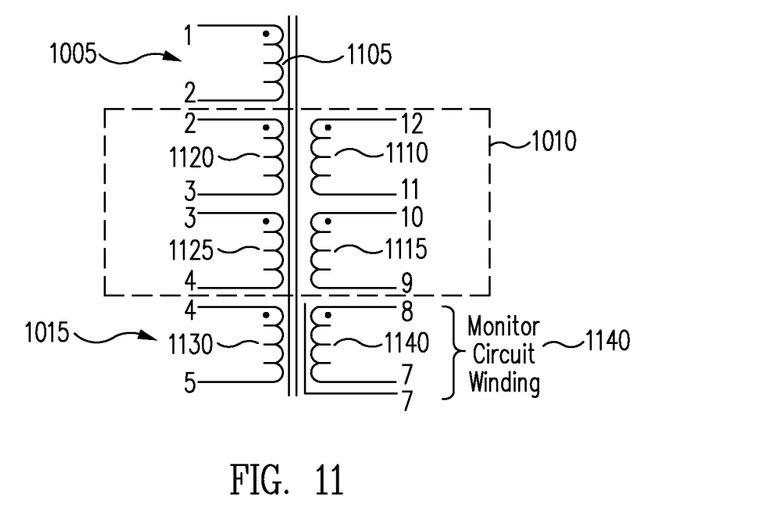
FIG. 11 is a schematic diagram for the wideband isolating transformer of FIG. 10.

The simultaneous winding of the primary and secondary to form center section 1010 may form one single layer or two separate layers. In a separate layering scheme, secondary winding 1120 and primary winding 1110 are wound simultaneously to form a first layer in center section 1010. Thus, while winding 1110 is wound from pin 12 to pin 11, winding 1120 is wound from pin 2 to pin 3. Windings 1120 and 1110 thus complete a first layer in center section 1010. To form the second layer, primary winding 1115 and secondary winding 1125 are wound simultaneously over the first layer formed by windings 1110 and 1120. Thus, while winding 1115 is wound from pin 10 to pin 9, winding 1125 is wound from pin 3 to pin 4. To achieve even better coupling, windings 1110, 1115, 1120, and 1125 are wound simultaneously in a single layer. Thus, while winding 1110 from pin 12 to pin 11, winding 1115 is wound from pin 10 to pin 9, winding 1120 is wound from pin 2 to pin 3, and winding 1125 is wound from pin 3 to pin 4. This single layer maximizes coupling from the primary to the secondary and thus reduces leakage inductance. However, the single layer also introduces the possibility of a voltage gradient between windings in the single layer. For example, windings 1110 and 1115 will be physically "superimposed" in the resulting single layer. However, the placement of the combined windings in center section 1010 advantageously reduces the voltage gradient resulting from a single layer approach.

Table 2 below provides an example transformer winding order for transformer 1000. Secondary winding 1105 is first wound between pins 1 and 2 around bobbin 1020 to finish first section 1005, which is then wrapped with a layer of insulation tape. Combined center section 1010 is then formed using windings 1110, 1115, 1120, and 1125 wound simultaneously with regard to pins 12-11, 10-9, 2-3, and 3-4, respectively. Combined center section 1010 may then be wrapped with a layer of insulation tape. Secondary winding 1130 is then wound around the insulation tape between pins 4 and 5 to complete final section 1015. After wrapping final section 1015 in insulation tape, an electrical screen, and another layer of insulation tape, the construction is completed by winding monitoring winding 1140 around the final layer of insulation tape.

TABLE 2

| Wiring order: | Pins |
|---|---|
| Layer 1 | 1-2 |
| Insulation Tape | |
| Layer 2 | Combined windings for 2-3, 3-4, 10-9 and 12-11 All wound simultaneously to achieve close proximity and corresponding low leakage. |
| Insulation Tape | |
| Layer 3 | 4-5 |
| Insulation Tape | |
| Electrical Screen | |
| Insulation Tape | |
| Layer 4 | 7-8 |

Figure 12:
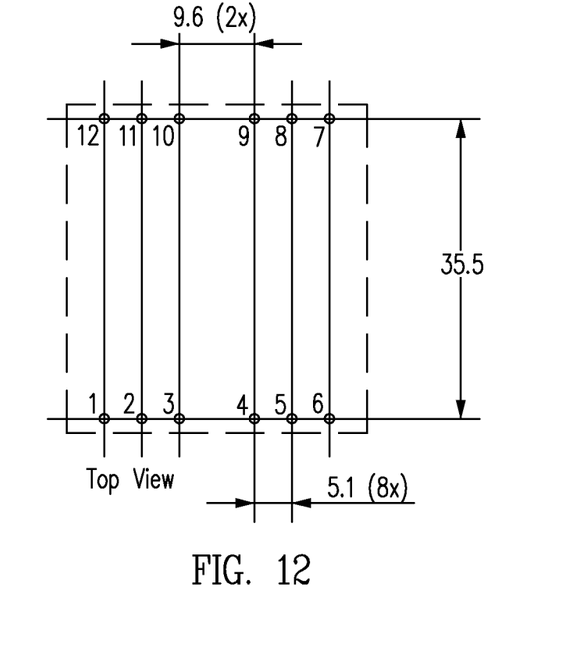
FIG. 12 is top view of an example pin arrangement for the transformer of FIGS. 10 and 11.

FIG. 12 shows an example arrangement of pins 1 through 12 shown in FIG. 11. In this embodiment, pins 1 through 6 are separated from pins 7 through 12 by a width of 35.5 mm. Pins 3 and 4 as well as pins 9 and 10 are separated by a gap of 9.6 mm whereas the remaining pins are each separated from adjacent pins by gaps of 5.1 mm.

Combined center section 1010 advantageously addresses corona effects at high voltage because of its central location on the secondary coil. Such a location relieves the need for high wire insulation due to its reduced voltage gradient. Moreover, the simultaneous winding of the primary and secondary windings in combined center section 1010 leads to very low leakage inductances. For example, both the primary and secondary leakage inductances may be readily maintained at less than or equal to 0.5 µH although these leakage inductances may still be tolerable as high as 1.0 µH. Despite this low leakage inductance, transformer 1000 offers relatively high levels of shunt impedance such as a minimum of 2.2 mH in low frequency operation.

In one embodiment, the following winding turns may be used. Winding 1105 in first section 1005 may comprise a 0.35 mm diameter wire with 48 turns. The same wire and winding turns may be used for final section 1015 for winding 1130. The primary coil in combined center section 1010 may comprise a 0.9 mm diameter wire with 24 turns for each of windings 1110 and 1115. Secondary windings 1120 and 1125 in combined center section 1010 may each comprise a 0.35 mm diameter wire with 24 turns. It will be appreciated, however, that other wire diameters and winding turns may be used depending upon the individual wideband system requirements.

As those of skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A wideband sonar transmitter, comprising:
    a power supply;
    a pair of switches; and
    a wideband transformer having a secondary coil for driving a transducer and a primary coil having a center tap driven by the power supply, wherein a first end of the primary coil couples to ground through a first one of the switches and a second end of the primary coil couples to ground through a second one of the switches, and wherein the wideband transformer includes a secondary coil including a plurality of windings arranged into a first section, a middle section, and a final section, and a primary coil winding wound only with the secondary coil windings forming the middle section.

2. The wideband sonar transmitter of claim 1, wherein the switches comprise MOSFET transistors.

3. The wideband sonar transmitter of claim 1, further comprising digital logic configured to generate on and off times for each of the switches in the pair of switches to approximate a desired waveform across the transducer.

4. The wideband sonar transmitter of claim 3, wherein the digital logic includes an FPGA adapted to store an array of the on and off times.

5. The wideband transmitter of claim 4, further comprising a CPU configured to select for a desired chirp waveform and to calculate the on and off times accordingly.

6. The wideband transformer of claim 1, wherein the primary coil comprises two windings separated by a first center tap, and wherein the middle section of the secondary coil comprises two windings separated by a second center tap.

7. The wideband transformer of claim 1, further comprising:
    a first layer of insulation separating the first section from the middle section, and
    a second layer of insulation separating the middle section from the final section.

8. The wideband transformer of claim 1, wherein a leakage inductance for the primary coil winding is no greater than 1.0 µH over an operating frequency range of 25 KHz to 255 KHz.

9. The wideband transformer of claim 1, wherein a shunt inductance for the primary coil winding is at least 2.2 mH over an operating range of 25 KHz to 255 KHz.

10. A method of generating wideband sonar pulses, comprising;
    in digital logic, analyzing a desired wideband sonar signal to identify positive half cycles and negative half cycles of the desired signal; and
    with regard to each half cycle, approximating the half cycle by driving switches coupled to a transformer's primary coil to produce at least one voltage pulse across a secondary coil for the transformer to produce a series of voltage pulses approximating the desired signal.

11. The method of claim 10, wherein the switches are driven so as to pulse width modulate the voltage pulses so as to approximate a desired peak amplitude for each half cycle.

12. The method of claim 11, wherein each half cycle is approximated by a single voltage pulse.

13. The method of claim 11, wherein each half cycle is approximated by a pair of voltage pulses.

14. The method of claim 13, wherein the switches are driven so as to produce a desired separation between the voltage pulses in each pair.

15. The method of claim 14, wherein the desired separation suppresses a harmonic in an approximated signal formed by the series of voltage pulses.

16. A sonar, comprising
   a power supply;
   a pair of switches; and
   a power amplifier including a wideband transformer having a secondary coil for driving a transducer and a center-tapped primary coil driven by the power supply, the center tap coupling to the pair of switches, wherein the wideband transformer includes:
      a secondary coil including a plurality of windings arranged into a first section, a middle section, and a final section; and
      a primary coil winding wound only with the secondary coil windings forming the middle section.

17. The sonar of claim 16, further comprising a signal generator for driving the pair of switches so as to drive the secondary coil with an approximately sinusoidal voltage.

18. The sonar of claim 17, wherein the power supply comprises a bank of capacitors controlled by the signal generator.

19. The sonar of claim 16, wherein a leakage inductance for the primary coil winding is no greater than $1.0\,\mu H$ over a sonar operating frequency range of 25 KHz to 255 KHz.

* * * * *